United States Patent [19]
Pavlik

[11] 3,710,104
[45] Jan. 9, 1973

[54] METHOD AND APPARATUS FOR X-RAY INTERROGATION OF A SAMPLE

[75] Inventor: William R. Pavlik, Parma, Ohio
[73] Assignee: Republic Steel Corporation, Cleveland, Ohio
[22] Filed: Nov. 4, 1969
[21] Appl. No.: 873,781

[52] U.S. Cl..........250/51.5, 250/43.5 R, 250/83.3 D
[51] Int. Cl..............................................G01n 23/20
[58] Field of Search........250/51.5 R, 43.5 D, 43.5 R, 250/83.3 D, 105

[56] References Cited

UNITED STATES PATENTS 3,567,929  3/1971  White...............................250/51.5

*Primary Examiner*—James W. Lawrence
*Assistant Examiner*—D. C. Nelms
*Attorney*—Robert P. Wright and Joseph W. Malleck

[57] ABSTRACT

A system for and method of analyzing material by X-ray radiation techniques. Material under inspection is irradiated by primary X-rays; fluorescent X-rays emitted by the material are analyzed to determine the constituency of the material. Backscattered primary X-ray radiation is detected to determine the amount of material present to compensate for material loading. The primary X-ray radiation may include a component of the fluorescent X-ray radiation of an energy in the order of the energy of fluorescent X-ray emission in the sample so as to enhance fluorescent emission in the sample. The applied fluorescent X-ray radiation may be generated by a collimator used to house the primary source and which is stimulated by the source to fluoresce.

8 Claims, 4 Drawing Figures

METHOD AND APPARATUS FOR X-RAY INTERROGATION OF A SAMPLE

BACKGROUND OF THE INVENTION

This invention relates to non-contact techniques for analyzing materials. More particularly it relates to the analyzing of materials by radiant energy, and specifically by X-ray analysis.

The analysis of materials by X-ray techniques is well known. Techniques in the past have generally suffered from the standpoint that they are geometry sensitive, requiring that a specific sample size be dealt with. In most cases, part of a stream of material has been diverted for analysis. The disadvantage with such arrangements is that the sample diverted may not be representative of the remainder of the material under test. Further, elaborate diverting techniques must be followed.

Dukes et al. U.S. Pat. No. 3,087,061 is directed to a composition insensitive beta ray gauging system. The patent does not provide a system for analyzing materials and overcoming the effects of amount or geometry of material.

Engel et al. U.S. Pat. No. 3,354,308 discloses an X-ray analyzing system utilizing the detecting of fluorescent X-rays to determine the constituency of a sample and fluorescent X-rays from a ring interposed in a sample stream to determine sample density. Engel et al. show the use of a complicated system for handling the flow of moving material, not suitable for many materials under analysis.

BRIEF DESCRIPTION OF THE INVENTION

The present invention utilizes fluorescent X-ray analysis to determine the constituency of a sample, concurrently with the sensing of backscattered primary radiation to determine and compensate for the amount of material present in the sample. The sample is irradiated by radiation from a primary source. Commercially available sources may not radiate in an energy band close to that of fluorescent radiation in the sample. In order to enhance such fluorescent radiation in the sample, a collimator is used to house the primary source and to direct radiation into the sample under test. The collimator material is such that, when irradiated by the primary source, it fluoresces, thereby emitting radiation which is also directed into the sample. The energy of the fluorescent radiation from the collimator is chosen to be in the order of the energy of fluorescence in the sample. By this technique, the sample fluorescence is enhanced.

Fluorescence from the sample and backscattered primary radiation are sensed and classified according to energy. Depending upon the type of material present, the energy of the fluorescent radiation will vary. Depending upon the amount and geometry of material present, the backscattered primary radiation will vary. Accordingly, the sensing of fluorescent radiation and backscattered primary radiation provides an indication of the type of material and quantity present in the sample under test.

Accordingly, an object of the present invention is to provide for improved non-contact techniques for analyzing materials.

Another object of the invention is to provide for improved material analysis by X-ray techniques.

Still another object of the invention is to provide for material sensing by X-ray analysis in which the quantity and geometry of a material present is taken into account.

A further object of the invention is to provide for the quantative and qualitative analysis of materials by radiant energy techniques.

DETAILED DESCRIPTION

Figure 1:
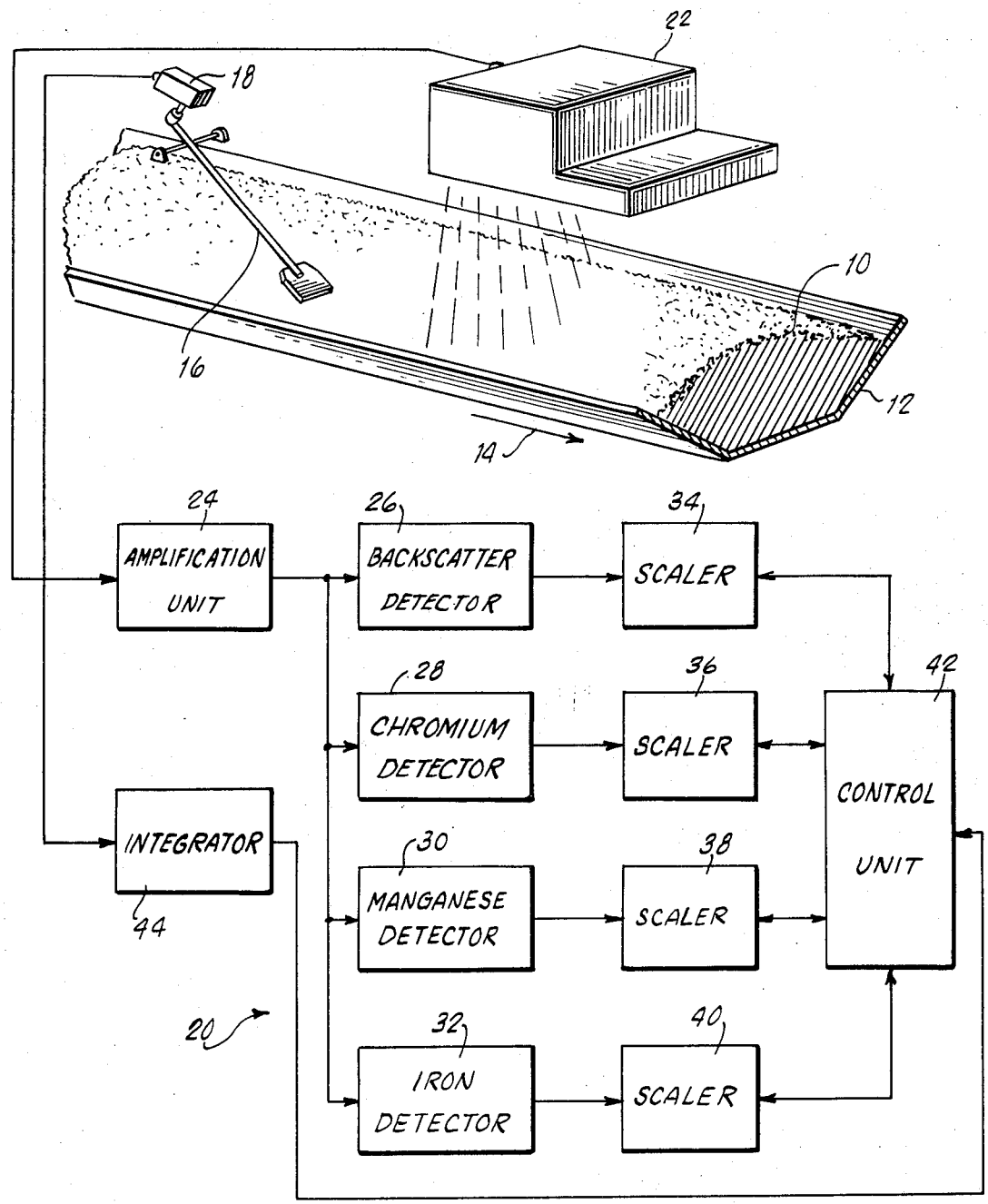
FIG. 1 is a perspective view and block diagram representation of a system embodying the invention.

Turning to FIG. 1, a system in accordance with the present invention is shown. The system is for the analysis by radiation techniques of a stream of material 10 carried on a conveyor 12 moving in the direction of arrow 14. The material under test may be of any type. As an example of the application of the present invention to the field of steel making, the material on the conveyor 12 may be granular in form and composed of ferroalloys and fluxes.

The presence of material on the conveyor 12 is sensed by a paddle switch arm 16 which actuates a switch (not shown) in a housing 18. When material is present on the conveyor, a suitable signal is developed for application to an analyzing system 20, shown in block diagram form in FIG. 1.

Downstream of the paddle switch arm 16, there is located a housing 22 containing a source of radiation and a detector of radiation, all to be described in greater detail in connection with FIGS. 3 and 4. The radiation source within the housing 22 causes the material 10 on the conveyor 12 to be irradiated by radiant energy. In a representative embodiment of the invention, the radiant energy from the housing 22 is X-ray energy, chosen to be as close as possible to the energy of the fluorescent X-ray energy level of the material on the conveyor 12 in order to enhance the stimulation of fluorescent X-ray radiation by that material. The detector within housing 22 senses radiation from the material on the conveyor, which radiation consists of fluorescent X-ray radiation radiated by the material as well as primary radiation from the source within the housing 22 that is backscattered by the material on the conveyor. A suitable signal is developed by the detector within the housing 22 which is also applied to the analyzing system 20 shown in FIG. 1. The analyzing system 20 utilizes the detected radiation signal to provide an indication of the quality and quantity of material present on the conveyor 12.

To explain the analyzing system 20 in more detail and specifically in the context of steel making, it is assumed that the material 10 on the conveyor 12 broadly comes within one of the following four major classifications:

I. Chrome
Stainless Charge Chrome
Medium Carbon Ferrochrome
9 percent Carbon Ferrochrome
5 percent Carbon Ferrochrome
0.5 percent Carbon Ferrochrome
65/5 Ferrochrome
36/40 Ferrochrome Silicide
40/40 Ferrochrome Silicide
7 percent High Silicon Ferrochrome
II. Manganese
Regular Ferromanganese
Medium Carbon Ferromanganese
0.10 percent Carbon Ferromanganese
2 percent Carbon Ferromanganese
Ferromanganese Silicide
III. Iron
75 percent Ferrosilicon
50 percent Ferrosilicon
Iron Ore
Taconite
Scrap Dust
IV. Other Material
Burnt Lime
Roasted Dolomite
Raw Dolomite
Carbon-90
Fluorspar
Aluminum Pellets
Sand
98 percent Ferrosilicon To explain the above classifications, it is considered first that basically chrome material may be constituted of one of the nine different materials listed as representative. The first six and the ninth materials listed under chrome above are constituted roughly of 60 – 70 percent chrome, with the remainder principally iron and including varying amounts of carbon. Stainless charge chrome and 9 percent carbon ferrochrome are roughly the same and include about 9 percent carbon content. Medium carbon ferrochrome and 5 percent carbon ferrochrome are roughly the same, including about 5 percent carbon. The two ferrochrome silicides listed include varying amounts of chrome (respectively 36 percent and 40 percent, equal amounts of silicon, roughly 40 percent) with the remainder being constituted principally of iron.

Five different basic manganese compositions have been listed. The first four are roughly 75–90 percent manganese, with varying amounts of carbon as given. Regular ferromanganese and medium carbon ferromanganese differ principally as to the carbon contained, with the regular product including approximately 7 percent carbon and the medium product somewhat less carbon. Ferromanganese silicide has approximately 63–66 percent manganese, 28–32 percent silicon, and the remainder iron.

Five representative iron products have been listed. In the first two, the percentage given is the percentage of silicon in the product, with the remainder being principally iron. Scrap dust has been included, for example representing the scrap from grinding operations and which may include 18 percent chrome, 8 percent nickel, and the remainder iron. Although the classification of III above has been designated as "Iron," it is also concerned with the presence of silicon. Silicon fluorescent X-rays are difficult to detect due to their low energy. In the present invention, the detection of iron X-rays in the absence of chromium and manganese X-rays, is used to classify a material as ferrosilicon.

Finally, under the classification "other" material, eight representative materials have been listed. Carbon-90 is a product consisting of about 90 percent carbon. The ferrosilicon product is 98 percent silicon, and the remainder iron.

As noted above, the four classifications are representative, and the listings among each classification are also representative. The classifications given above are particularly suitable in the steel making field in which it is desired broadly to classify material into one of the four groups given above. Typically it is not necessary to distinguish between materials coming within any given classification.

Referring again to FIG. 1, the detected radiation from the material 10 on the conveyor 12 results in a signal which undergoes suitable amplification and other manipulation in an amplification unit 24. The signal from the unit 24 is applied to each of four detectors 26 (backscatter detector), 28 (chrome detector), 30 (manganese detector) and 32 (iron detector). Each of these detectors operates so as to isolate a particular component from the overall signal generated by the amplification unit 24. In particular the backscatter detector 26 isolates that component of the overall signal representing backscattered primary radiation from the material on the conveyor. Chromium detector 28 isolates that component of the overall signal representing fluorescent radiation from chromium type materials, such as those listed in Item I of the table above. Manganese detector 30 isolates that component of the overall signal representing fluorescent radiation from manganese type materials, such as those listed in Item II of the table above. The iron detector 32 isolates that component of the overall signal representing fluorescent radiation from iron type materials, such as those listed in Item III of the table above.

The detectors just described are typically single channel analyzers which receive input pulses and sort the pulses according to amplitude. The backscatter detector 26, for example, may be a single channel analyzer that produces an output pulse for each input pulse that represents backscattered radiant energy from the material on the conveyor that is around the energy level of 22 KEV. Similarly, the chromium, manganese and iron detectors are set to produce output pulses representative of radiant energy from the material on the conveyor respectively of the order of 5.414 KEV, 5.898 KEV and 6.403 KEV. These KEV values are representative of the K and K$_1$ series of X-ray radiation. In practice, the amplification unit 24 in association with each one of the detectors 26 to 32 provides for the passing of a band of X-ray energies. The center of the band is not necessarily at the KEV level mentioned above. In particular, the chromium band is displaced so that its center point is somewhat less than 5.414 KEV, while the iron band is displaced so that its center point is somewhat above 6.403 KEV. In this fashion, the overlapping of the chromium and iron bands with the manganese band is avoided.

Thus the amplification unit 24 and each one of the detector units 26 to 32 constitutes a channel for the isolation of X-ray energy.

The pulses generated by the detector units 26 to 32 are applied to corresponding scalers 34, 36, 38 and 40, which typically are counters that count the input pulses that are applied thereto and provide suitable output signals. The scalers are shown coupled to a control unit 42 applying signals to the control unit and receiving signals from the control unit, e.g. for resetting purposes.

The control unit also receives a signal from an integrator 44 coupled to the paddle switch 18. The integrator 44 is typically a capacitative-resistive network which smooths the signal developed by the switch 18. In this fashion, if there is a momentary gap or void in the material 10 on the conveyor, the system 20 will not undergo a change, such as resetting, because of this temporary condition. Thus the integrator 44 provides for a smoothing of the signal from the switch 18 so that the system 20 is only responsive to long-term changes in material flow, i.e., when the flow ceases for a considerable period.

The control unit 42 functions to receive signals from the scalers and to provide an indication of the type of material present on the conveyor 12 as well as the quantity. For example, the backscatter scaler 34 provides an output signal representative of the backscattered primary radiation as detected from the material on the conveyor. The greater the quantity of material on the conveyor, the greater the backscattered radiation that is detected. The scalers 36, 38 and 40, on the other hand, provide an indication of the type of material on the conveyor. Depending upon which scaler experience the greatest count over a given testing period, the control unit will classify the material accordingly.

The relation between the counts in the different scaler units can be used to advantage to compensate for material loading changes on the conveyor 12. For example, a material loaded rather sparsely on the conveyor results in a lessened backscatter count than material loaded heavily. By the same token, material loading affects the fluorescent radiation from the material, i.e., more material results in a greater fluorescence. Accordingly, the output of the backscatter scaler 34 may be employed to modify the counts from the other scalers used to indicate the presence or absence of the materials sensed by those other channels. For example, as the count from the backscatter scaler 34 increases, the necessary count from the chromium scaler 36 may be made to increase before an indication of chromium will be given.

In this fashion, the chromium channel (detector 28 and scaler 36) the manganese channel (detector 30 and scaler 38) and the iron channel (detector 32 and scaler 40) provide an indication of the type of material present, while the backscatter channel (detector 26 and scaler 34) provide an indication of the quantity of material present and also a compensation for variable conveyor loading.

Besides providing an indication of quantity of material, the backscatter channel may also provide an indication of "other" material, such as listed on Item IV of the table above. For example, if burnt lime is present on the conveyor, the backscatter scaler 34 will provide a relatively high count to the control unit 42, while the remaining scalers will provide much less counts. It is obvious that the conveyor 12 is loaded with material which does not fall within one of the three arbitrary classifications given above, namely, chromium, manganese and iron. Thus the control unit 42 will provide an indication through the backscatter channel that "other" material is present.

FIG. 2

Figure 2:
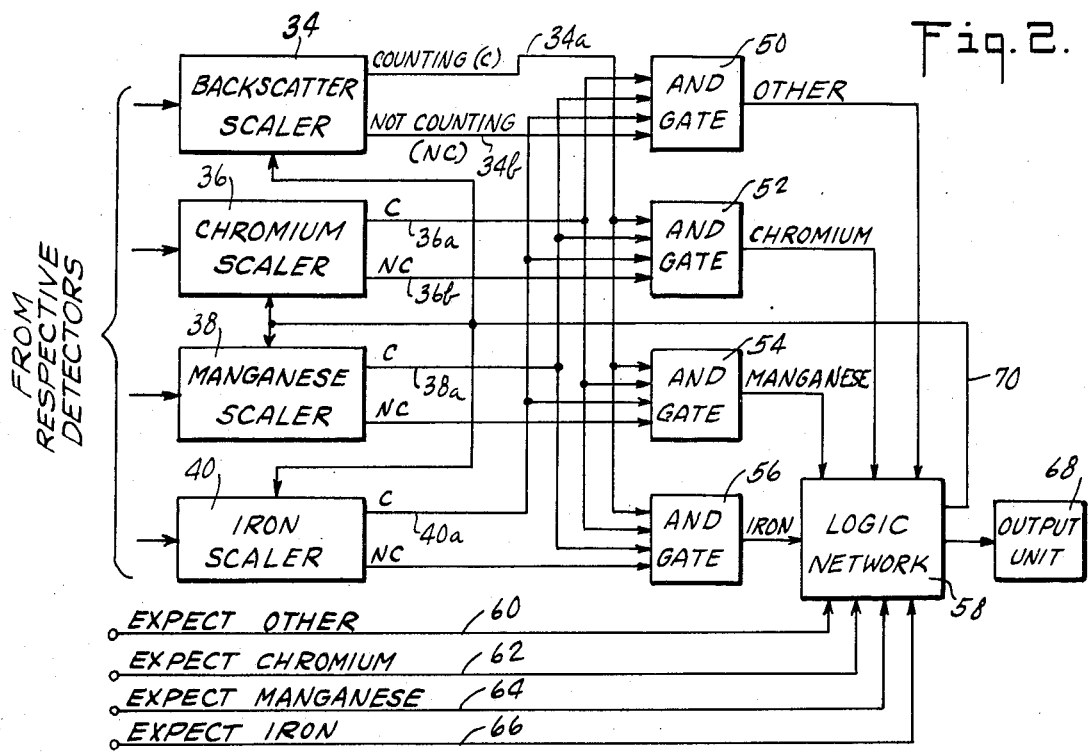
FIG. 2 is a block diagram showing further details of a representative system in accordance with the invention.

FIG. 2 shows a system in accordance with the invention in more detail than FIG. 1, for classifying material as coming within one of the four categories given in the table above, namely, chromium, manganese, iron and "other" material. Each of the scalers 34 to 40 is shown as having two outputs. For example, the backscatter scaler 34 has an output 34a which is active when the scaler is counting (c) and an output 34b which is active when the scaler is not counting (nc). Similarly, the chromium scaler has outputs 36a and 36b, as do the manganese and iron scalers 38 and 40. The outputs from the scalers are coupled to AND gates 50, 52, 54 and 56.

The AND gate 50, representing "other" material, is coupled to the not-counting output 34b of the backscatter scaler 34 and to the counting outputs 36a, 38a and 40a of the chromium, manganese and iron scalers. Similarly, AND gate 52, representing chromium material, receives the not-counting output 36b of the chromium scaler 36 and the counting outputs 34a, 38a and 40a of the backscatter, manganese and iron scalers. The AND gates 54 and 56, respectively representing manganese and iron, are similarly coupled to the outputs of the scalers 34 to 40.

The AND gates provide output signals which are applied to a logic network 58. The logic network also receives signals on conductors 60, 62, 64 and 66, respectively representing the expectation that "other" material, chromium, manganese and iron is present on the conveyor 12. Only one of the conductors 60 to 66 is normally active; for example, the expect-chromium conductor 62 is active when chromium material is expected on the conveyor 12. The logic network 58 compares the outputs of the AND gates 50 to 56 with the signals on conductors 60 to 66 to provide an output indication through output unit 68 of whether the material expected on the conveyor 12 is actually present on the conveyor.

To provide an example of the manner in which the system of FIG. 2 operates, assume that the scalers 34 to 40 are all set to count to the same predetermined level. Accordingly, when one of the scalers reaches that preset counting level, its not-counting output will become active. For example, assume that the chromium scaler 36 first reaches its preset counting level, activating the conductor 36b. Assuming that all of the other scalers are still counting, in which case their counting outputs are active, the AND gate 52 is enabled to supply a signal to the logic network 58 indicating that chromium material is present on the conveyor 12. At this point the logic network may provide an output signal on conductor 70 coupled to all of the scalers 34 to 40 to provide a resetting of these scalers. Thus the system is reset as soon as any scaler reaches its preset counting level and is in position to go through another counting cycle. At the same time as the chromium signal is received in the logic network 58, a comparison is made with the signals on the conductors 60 to 66. If the expect chromium conductor 62 is active, a suitable output signal is provided to the output unit 68 indicating that in fact chromium is present on the conveyor 12. If the conductor 62 is not active, then a suitable indication, e.g., an alarm, is given by the output unit, indicating that while chromium is present on the conveyor 12, it was not expected.

In the example just explained, it is assumed that the scalers 34 to 40 are all set to the same counting level. It is, of course, possible to set the scalers to different levels, predetermined in advance, or to provide varying levels, for example, depending upon any number of factors, one of which might be the count in the backscatter scaler over a predetermined time period. Thus the counting levels may be made dependent upon the backscatter count, which is in turn dependent upon the loading of material on the conveyor 12. The backscatter count, while being used to indicate the presence of "other" material on the conveyor 12 (when the backscatter scaler has reached its preset count and the other scalers are still counting) also provides a compensation for the material loading on the conveyor 12. In particular, the backscatter scaler 34 serves as a variable timer with respect to the other scalers 36, 38 and 40. To explain in more detail, if a predetermined counting time period were employed to determine the presence or absence of chromium, manganese and iron, results would vary depending upon the loading on the conveyor 12. If the conveyor 12 is heavily loaded with "other" material, it is possible that one of the scalers 36, 38 or 40 would reach its preset counting level within the preset counting period. Thus, if the stream of FIG. 2 only took into account the counts on the chromium, manganese and iron scalers over a fixed time period, an erroneous indication of the presence of a particular material might be given. By introducing the backscatter count and requiring that that count be below a given level when any of the other counters reaches that level, the situation will be avoided where an indication is given that chromium, manganese or iron is present, when in fact it is not. The backscatter scaler thus is a variable timer which automatically varies the counting period in accordance with the material loading on the conveyor 12.

Figure 3:
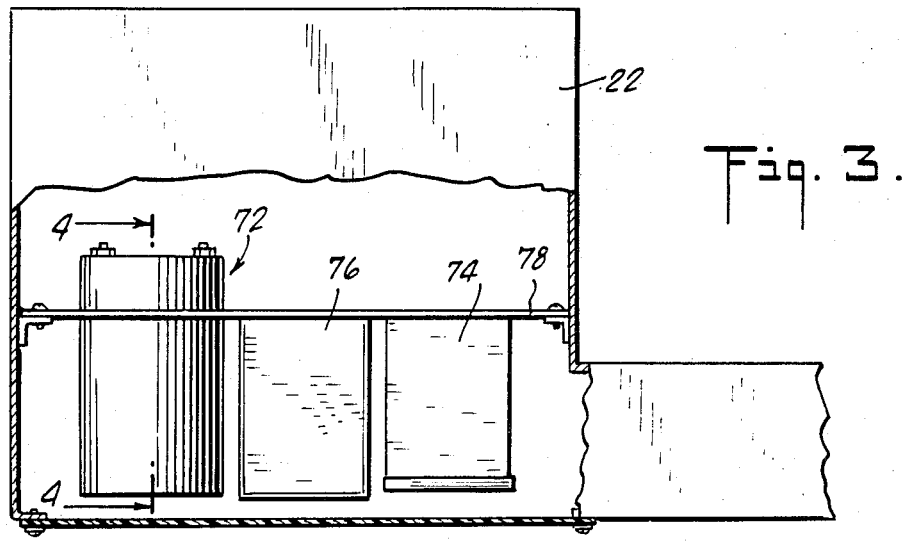
FIG. 3 is an elevational view, partly cut away, showing the details of a radiation source, shield and detector.
Figure 4:
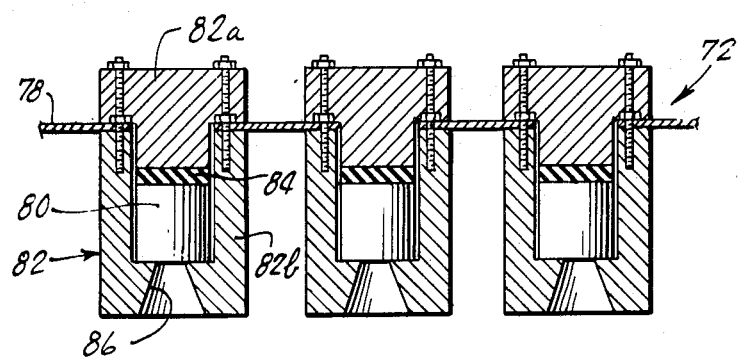
FIG. 4 is a sectional view taken along the section line 4—4 of FIG. 3 and showing the details of a representative radiation source structure in accordance with the invention.

FIGS. 3 and 4.

FIG. 3 gives the details of a representative housing 22 containing the radiation source used to irradiate the material on the conveyor 12, as well as the detector used to detect radiation from the material. The radiation source is designated generally by the numeral 72 in FIG. 3, and the detector by the numeral 74. The source 72 will be described in more detail in connection with FIG. 4. The detector 74 is typically a conventional proportional detector tube which converts X-ray energy into electrical pulses. The conversion retains a proportionality between the energy of the X-rays and the amplitude of the output pulses produced. A shield 76 is interposed between the source 72 and detector 74, so that the detector will not receive radiation directly from the source 72, but rather will receive only radiation emanating from the material on the conveyor, namely fluorescent X-rays and backscatter primary radiation.

FIG. 4 shows a representative radiation source 72. It is comprised of three identical units mounted on a plate 78. Each unit houses a primary radiation source 80, e.g., cadmium-109, which emits X-ray radiation at a level of 22 KEV, and gamma rays at a level of 88 KEV. The source is housed in a collimator 82, typically of copper, and consisting of an upper portion 82a and a lower portion 82b. A foam rubber spacer 84 may be employed between the collimator part 82a and the primary radiation source 80.

The collimator portion 82b includes a frustro-conical opening 86 therein, which serves to direct the conically-shaped beam of radiation downwardly into the material on the conveyor 12. The shape of the opening and the spacing of the collimator above the conveyor 12 is such as to provide radiation over the conveyor, but generally not beyond the sides of the conveyor.

As was mentioned above, a representative source of radiation is cadmium-109, which emits X-ray radiation at a level of 22 KEV. This primary radiation is used to stimulate fluorescent X-ray radiation in the material on the conveyor. In order to stimulate such fluorescence, the energy level of the radiation emanating from the primary source 80 should be of the order of the energy level of the fluorescent radiation from the material on the conveyor. In the examples given above for chromium, manganese and iron, the energy levels vary around 6 KEV. In order to provide for suitable stimulation of fluorescence, it has been found desirable to utilize the collimator material itself as a source of primary radiation. To elaborate, a representative collimator material is copper, which fluoresces at an energy level point of 8.047 KEV, which is much closer to the energy level of 6, around which the representative materials of chromium, manganese and iron fluoresce. Thus the primary source 80 stimulates fluorescent X-ray radiation in the collimator 82 and this fluorescent radiation is directed into the material on the conveyor 12, enhancing fluorescent X-ray radiation from that latter material.

SUMMARY

The invention provides for the non-contact analysis of moving material as carried out by X-ray radiation analysis. Fluorescent X-rays in particular are determined in order to classify material. Backscatter primary radiation is also utilized to classify the material, as well as to provide an indication of the amount and geometry of the material.

Additionally, a primary source of radiation is utilized to stimulate X-ray radiation in a source holder, and the radiation from the source and holder are utilized to stimulate emission in the material under analysis.

Although the specific embodiments disclosed operate in accordance with pulse signal techniques, the invention is not so limited. For example, X-ray diffraction techniques could be employed not involving pulse height analysis. Further, specific signal manipulations have been disclosed in carrying out particular analyzing functions. It should be noted that many data processing techniques are available for use in analyzing signals such as those utilized in the present invention. In particular, a special purpose computer or a general purpose computer specially programmed, may be used to analyze the radiation data developed. The significant contribution of the invention is the classification of material by radiation techniques, particularly using backscattered primary X-ray radiation and stimulated fluorescent Xaray radiation.

It is apparent that specific embodiments of the invention have been disclosed which are representative of methods and apparatus in accordance with the invention.

The invention should be taken to be defined by the following claims:

1. A system for X-ray interrogation of a sample under test, comprising:
   a. means for applying primary X-ray radiation to the sample;
   b. means for generating a signal representative of the presence of a material expected in the sample;
   c. means for detecting backscattered primary X-ray radiation from the sample; and
   d. means for detecting fluorescent X-ray radiation emitted by the sample and responsive to this detected radiation for generating an output signal when the sample material is different from that expected.

2. A system for X-ray interrogation of a sample under test, comprising:
   a. means for applying primary X-ray radiation to the sample;
   b. means for detecting fluorescent X-ray radiation emitted by the sample; and
   c. means for detecting backscattered primary X-ray radiation from the sample;
in which the means (b) and (c) comprise means for sensing radiation from the sample, and means for classifying the sensed radiation in accordance with energy level; in which a plurality of channels are provided corresponding to different bands of radiant energies, each channel including a pulse generating means for generating a pulse signal in accordance with the radiation sensed from the sample coming within the energy band, means for counting pulses from the pulse generating means, and means responsive to the pulse counts in the different channels for providing an indication of the material in the sample; including means for establishing a predetermined count for each of the different channels, and means for detecting when one of the channels reaches its predetermined count.

3. A system in accordance with claim 2, in which the last-mentioned means includes means for detecting whether or not the other channels have reached their predetermined counts when said one channel is detected as reaching its predetermined count.

4. A system for X-ray interrogation of a sample under test, specifically for the determination of chromium, manganese, iron or other material in a sample, comprising:
   a. means for applying primary X-ray radiation to the sample;
   b. means for detecting fluorescent X-ray radiation emitted by the sample; and
   c. means for detecting backscattered primary X-ray radiation from the sample;
in which the means (b) and (c) comprise means for sensing radiation from the sample, and means for classifying the sensed radiation in accordance with energy level; including four channels corresponding to bands of energy representing X-ray radiation from the sample of the K and $K_{\alpha 1}$ series of which chrome is 5.41 KEV, manganese is 5.898 KEV, iron is 6.403 KEV, and the backscatter level corresponding to other material is about 22 KEV, means for generating a pulse in each channel each time radiant energy is received from the sample within the energy band of the particular channel, means for counting the pulses in each channel, and means for providing an indication of the counts in the channels.

5. A system in accordance with claim 4 in which the last-named means classifies the sample as chromium or manganese or iron or other material depending respectively upon whether the count in the chromium or manganese or iron or backscatter channel has reached a predetermined level for the channel and the counts in the remaining channels have not reached corresponding predetermined levels for the channels.

6. A system in accordance with claim 5, in which the predetermined levels for all channels are the same.

7. A system in accordance with claim 5, including means for generating a signal representative of a material expected in the sample, and means responsive to the classified sample for generating an output signal when the sample material is different from that expected.

8. A system in accordance with claim 7, including enabling means sensing the presence of a sample for permitting operation of the system.

* * * * *